United States Patent [19]

Galand et al.

[11] Patent Number: 4,912,763
[45] Date of Patent: Mar. 27, 1990

[54] PROCESS FOR MULTIRATE ENCODING SIGNALS AND DEVICE FOR IMPLEMENTING SAID PROCESS

[75] Inventors: Claude Galand, Cagnes/Mer; Michele Rosso, Nice, both of France

[73] Assignee: International Business Machines Corporation, Armonk, N.Y.

[21] Appl. No.: 100,689

[22] Filed: Sep. 24, 1987

[30] Foreign Application Priority Data

Oct. 30, 1986 [EP] European Pat. Off. ............ 86430044

[51] Int. Cl.$^4$ ................................................ G10L 3/02
[52] U.S. Cl. ........................................ 381/31; 381/35
[58] Field of Search .................................... 381/29–32, 381/35, 36

[56] References Cited

U.S. PATENT DOCUMENTS

| | | | |
|---|---|---|---|
| 4,464,783 | 8/1984 | Beraud et al. | 381/31 |
| 4,589,130 | 5/1986 | Galand | 381/31 |
| 4,622,680 | 11/1986 | Zinser | 381/31 X |
| 4,677,671 | 6/1987 | Galand et al. | 381/31 |
| 4,713,776 | 12/1987 | Araseki | 381/31 X |

OTHER PUBLICATIONS

Proceedings of the IEEE International Conference on Acoustics, Speech and Signal Processing, Boston, Apr. 14th–16th, 1983, vol. 3, pp. 1284–1287, IEEE, New York, U.S.; C. R. Galand et al.: "Multirate Sub-Band Coder with Embedded Bit Stream: Application to Digital TASI".

Proceedings of the IEEE International Conference on Acoustics, Speech and Signal Processing, Tampa, Mar. 26th–29th, 1985, vol. 4, pp. 1680–1683, IEEE, New York, U.S.; J. H. Derby et al.: "Multirate Sub-Band Coding Applied to Digital Speech Interpolation".

Primary Examiner—William M. Shoop, Jr.
Assistant Examiner—Marc S. Hoff
Attorney, Agent, or Firm—Joscelyn G. Cockburn

[57] ABSTRACT

A process for multirate subband encoding voice signals.

At least a portion of the original signal bandwidth is split into p sub-bands the contents of which are to be coded using dynamic allocation of quantizing levels throughout the sub-bands.

Let's assume the signal is to be coded for a set of coding rates $R(1) < R(2) < \ldots < R(k) \ldots < R(K)$. First the number of quantizing levels $l(i, R(1))$ for the lowest rate is determined. Then the levels for $l(i, R(k))$, $k=2, \ldots, p$ are determined using:

$$l(i, R(k)) = l(i, R(1)) \times 2^{\left(\frac{R(k) - R(2)}{p}\right)}$$

Then the sub-band samples $S(i,j)$ are quantized according to $l(i, R(K))$. Finally, the quantized sub-band samples are embedded into a multirate frame.

15 Claims, 13 Drawing Sheets

FIG. 2
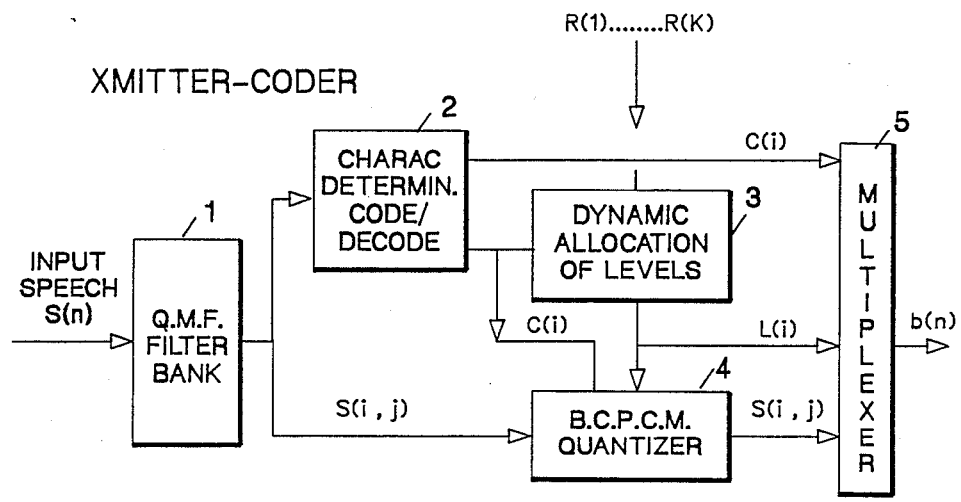
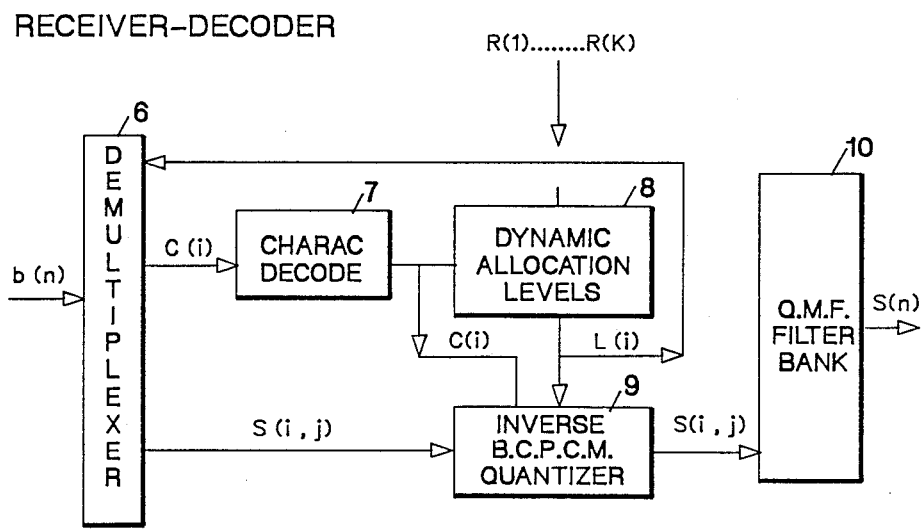

FIG. 3A
FRAME AT RATE R(K)
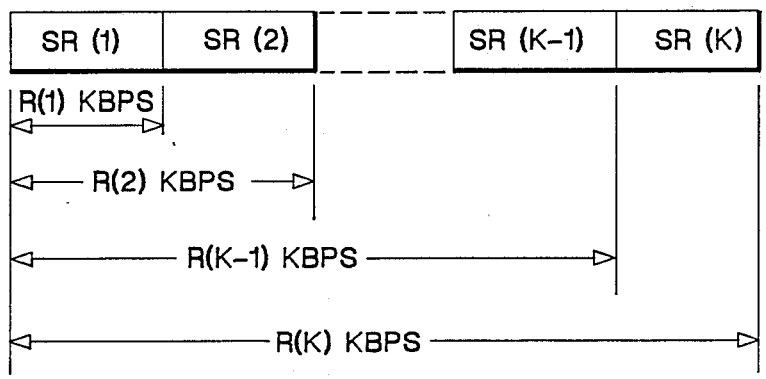
FIG. 3B
FRAME AT RATE R(K-1)
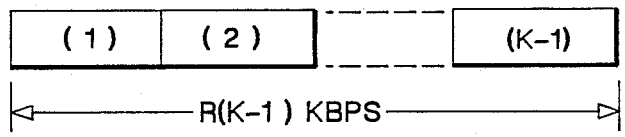
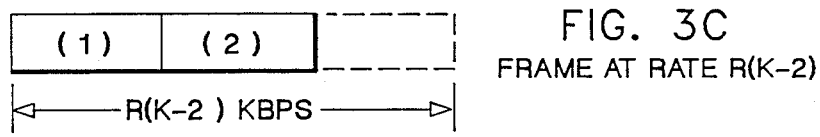
FIG. 3C
FRAME AT RATE R(K-2)
FIG. 3D
FRAME AT RATE R(1)
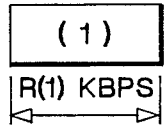

DECISION (DL), TRANSMITTED (TL), AND RECONSTRUCTION
LEVELS (RL) IN THE CONSIDERED EXAMPLE.

| 24 LEVELS QUANTIZER | 12 LEVELS QUANTIZER | 3 LEVELS QUANTIZER |
|---|---|---|
| RL ———— | | |
| 11 ——————DL – TL | | |
| RL ———— | | |
| 10 ——————DL – TL | 5 ——————DL – TL | |
| RL ———— | | |
| 9 ——————DL – TL | | |
| RL ———— | | |
| 8 ——————DL – TL | 4 ——————DL – TL | 1 ————TL-RL |
| RL ———— | | |
| 7 ——————DL – TL | | |
| RL ———— | | |
| 6 ——————DL – TL | 3 ——————DL – TL | |
| RL ———— | | |
| 5 ——————DL – TL | | |
| RL ———— | | |
| 4 ——————DL – TL | 2 ——————DL – TL | ————DL |
| RL ———— | | |
| 3 ——————DL – TL | | |
| RL ———— | | |
| 2 ——————DL – TL | 1 ——————DL – TL | |
| RL ———— | | |
| 1 ——————DL – TL | | |
| RL ———— | | |
| 0 ——————DL – TL | 0 ——————DL – TL | 0 ————TL-RL |
| RL ———— | | |
| -1 ——————DL – TL | | |
| RL ———— | | |
| -2 ——————DL – TL | -1 ——————DL – TL | |
| RL ———— | | |
| -3 ——————DL – TL | | |
| RL ———— | | |
| -4 ——————DL – TL | -2 ——————DL – TL | ————DL |
| RL ———— | | |
| -5 ——————DL – TL | | |
| RL ———— | | |
| -6 ——————DL – TL | -3 ——————DL – TL | |
| RL ———— | | |
| -7 ——————DL – TL | | |
| RL ———— | | |
| -8 ——————DL – TL | -4 ——————DL – TL | -1 ————TL-RL |
| RL ———— | | |
| -9 ——————DL – TL | | |
| RL ———— | | |
| -10 ——————DL – TL | -5 ——————DL – TL | |
| RL ———— | | |
| -11 ——————DL – TL | | |
| RL ———— | | |
| -12 ——————DL – TL | -6 ——————DL – TL | |

FIG. 12

PROCESS FOR MULTIRATE ENCODING SIGNALS AND DEVICE FOR IMPLEMENTING SAID PROCESS

BACKGROUND OF THE INVENTION

This invention deals with voice encoding techniques and more particularly with such techniques enabling multirate encoding of voice signals.

Sub-band coding (SBC) associated with dynamic allocation of bits resources (DAB) has been shown to be an efficient approach for digitally encoding speech signals. Such coding methods have been extensively described in the literature and patents. One may mention U.S. Pat. No. 4,142,071; the article "16K bps Real Time QMF Sub Band Coder Implementation", in IEEE ICASSP, Denver, April 1980, by C. Galand and D. Esteban; and the article "32K bps CCITT compatible Split Band Coding" presented by D. Esteban and C. Galand at the 1978 IEEE International Conference held in Tulsa, Oklahoma. These references should be considered herein incorporated by reference.

According to these coding methods, at least a portion of the original speech bandwidth is split into several sub bands the contents of which are quantized with a dynamic sharing of the quantizing resources throughout the sub bands based on their respective energy contents. In addition, applying Block Companded Pulse Code Modulation (BCPCM) to the above methods enables dynamically allocating the quantizing resources over fixed length consecutive speech segments (e.g. 16 ms long). In other words, the sub band quantizing resources distribution needs only being repeated at the segment rate, i.e. every 16 ms. By quantizing resources one usually means quantizing bits as disclosed in the above cited references.

For more detailed information on BCPCM one may refer to an article by A. Croisier relating to a lecture given at the International Seminar on digital Communication, in Zurich, Switzerland, and entitled, "Progress in PCM and Delta Modulation: Block Companded Coding of Speech Signal". In summary, for each block of N samples representing a 16 ms long segment of voice signal, a scale factor C is chosen such that the largest sample of the block does not fall outside the coding limits. Them, the N samples of the block are requantized, based on this factor.

In Split band coders this requantizing is performed separately in each sub band, with the quantizing resources being dynamically allocated throughout the sub bands based on their energy contents. BCPCM suits particularly well for coding methods requiring information relative to energy of the signal to be processed since energy could be conveniently approximated using a readily available BCPCM parameter, i.e. the so-called scale factor or characteristic "C".

In addition, application of sub-band coders to Time Assignment Speech Interpolation systems (TASI) has been proposed in the European patent application No. 85 820 "Multirate digital transmission method and device for implementing said method" with a new TASI approach for embedded bit stream. For that purpose, the output of the SBC speech compressor is arranged in an embedded bit stream, i.e. which accepts bit deletion and insertion for dynamic rate conversion. This property is of high importance in a digital communication network, since it allows the bit stream to be flagged at any overloaded node without tandeming or freeze-out.

On the other hand, sub-band coding with dynamic allocation of levels (DAL) has been shown to achieve a significant improvement over SBC with dynamic allocation of bits (DAB), specially for low bit rates. Such a technique has been disclosed in the European application No. 86,109,498.5 dated July 11, 1986 herein incorporated by reference.

OBJECT OF THE INVENTION

The present invention deals with sub band coding with dynamic allocation of levels and a multirate operation.

Another object of this invention is to provide a multirate voice encoding method with an optimal dynamic allocation of quantizing level resources.

Still another object of the invention is to provide a method for performing the concentration of several telephone lines on a wide band digital link in a multirate environment and dynamic allocation of quantizing levels.

These and other objects, advantages and features of the present invention will become more readily apparent from the following specification when taken in conjunction with the drawings.

Although the preferred embodiment will be described with reference to a split band voice coder as described in French Pat. No. 7,713,995 "Quantizing process with dynamic allocation of the available bit resources, and device for implementing said process" the invention applies as well to any coder wherein signal band-width splitting is operated over a portion of said bandwidth (e.g. to the signal base band) like in the so called voice excited predictive coders (VEPC) as well as to any coder for processing other than voice signals. It also applies to multirate encoding method intended for applications not related to transmission, like for instance for storing or otherwise processing.

BRIEF DESCRIPTION OF THE DRAWINGS

FIG. 2 is a block diagram of a coder/decoder using the invention.

FIG. 3 illustrates the multirate frame operation.

FIG. 12 is an illustrative example.

DESCRIPTION OF A PREFERRED EMBODIMENT.

Figure 1:
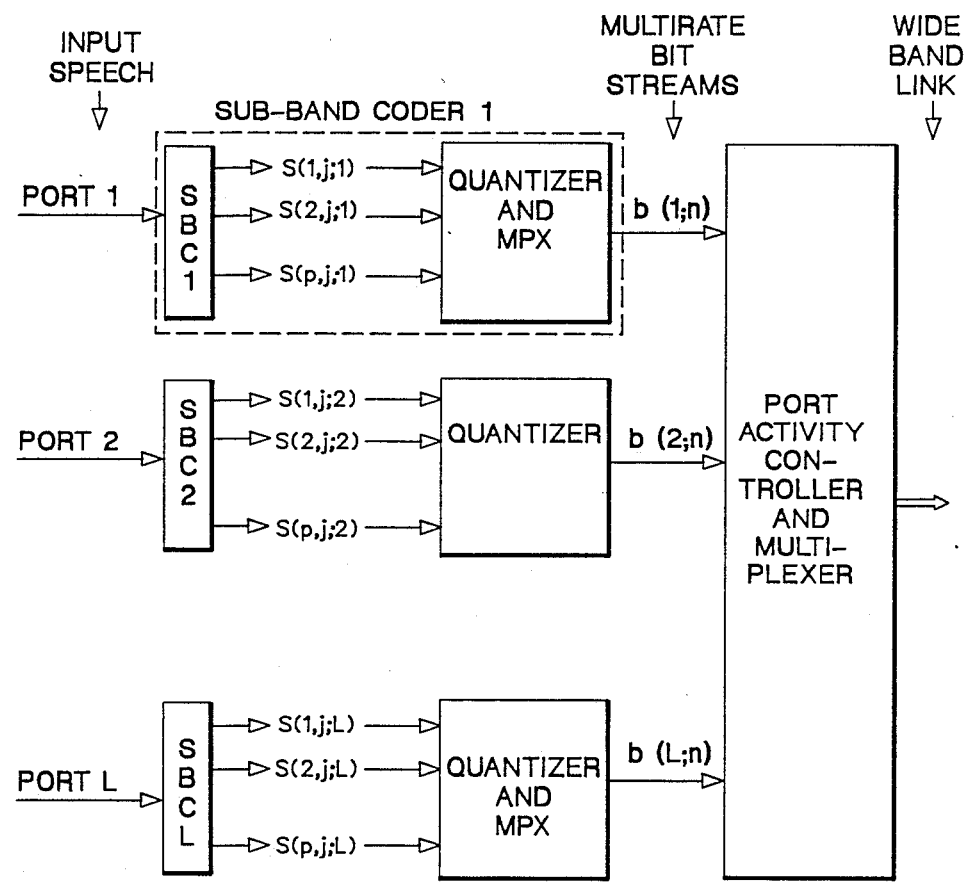
FIG. 1 shows the principle of application of the invention to L speech ports.

FIG. 1 shows the principle of operation for the coding of L speech ports and the multiplexing of the coded speech signals on a wide-band digital link.

Assuming each of the L input voice ports is split into p sub-bands (FIG. 1), the sub-band signals will be denoted:

$$S(i,j,k')$$

where $i =$ sub-band index    $i = 1, \ldots, p$
$j =$ sample index    $j = 1, \ldots, N$
$k' =$ port output    $k' = 1, \ldots, L$ Each port input $k'$ ($k'=1, \ldots, L$) is processed by a sub-band coder, the output of which is a multirate bit stream $b(k',n)$, where n is the time index, with embedded sub-streams. The L bit streams are then processed by a port activity controller in which the bit rate allocated to each port is adaptively computed according to the relative activities of the ports. Then, the bit stream representing each port is flagged (adjusted) according to the computed bit rate, and the residual bit streams are multiplexed and transmitted on the wide band link. The activity controller and multiplexer functions of FIG. 1 are functions well depicted by the state of the art including the above cited references and articles. We will thus focus here, more particularly, on the coder itself.

More precisely, we will describe a device to process speech signals allowing:

each port the best sub-band levels allocations corresponding to a prescribed set of bit rates, sub-band encoding the speech signal according to the determined levels, and multiplexing the coded samples in an embedded multirate bit stream or frame.

The multirate bit stream $b(k',n)$ provided by each port will then be inserted into a larger multiplexed bit stream to be eventually fed onto a wide band link. For that purpose, the port Activity Controller and Multiplexer will reshape each $b(k',n)$ stream according to the relative energy contained therein and the selected set of rates, before multiplexing it on the wide band link.

FIG. 2 represents the block diagram of a sub-band coder/decoder, operating in a multirate mode with dynamic allocation of levels. The input to the coder is a speech signal $S(n)$ sampled at 8 kHz, for instance, and the output of the coder is a multirate bit stream $b(n)$ which is forwarded to the decoder. The output of the decoder is a replica $S(n)$ of the original speech signal.

The multirate sub-band coder operates at the rates $R(1), R(2), \ldots, R(k), \ldots, R(K)$; with $R(1) < R(2) < \ldots < R(K)$. So, the transmitted bit stream is arranged into frames corresponding to the highest bit rate $R(K)$ with sub-frames corresponding to the various other rates (FIG. 3). This arrangement is made in the multiplexer (device 5 in FIG. 2), according to the level allocations computed in the device 3 of FIG. 2.

A similar problem has already been considered and solved in connection with dynamic allocation of quantizing bits rather than levels. It may be noted from the above cited references that multirate allocation of the bit resources is based on first optimally allocating the bits for the highest rate and then subsequently bit by bit reducing this allocation to get the lower bit rates allocations.

Applying this strategy to the multirate allocation of levels with optimum and integer level allocations at all rates can be achieved if all rate levels are even (only the lowest level can be odd) and if the highest bit rate levels are limited to being a multiple of:

$$2\left(\frac{R(k)^2 - R(1)}{p}\right)$$

This obviously may be a serious drawback for applying the referenced multirate technique in conjunction with DAL approaches.

Based on this observation and on the fact that the DAL allocation is much more efficient for low rates than the DAB allocation is, then a new and different approach has to be provided for multirate with DAL, to avoid the above mentioned drawbacks.

One object of the present invention is precisely to adaptively determine for each of the considered bit rates $R(1), \ldots, R(K)$, the distribution of the quantizing levels in the sub-bands, allowing for minimum distortion in the reconstructed speech signal $S(n)$, and subject to the constraint of having an embedded bit stream.

The last point means that, given a frame corresponding to the rate $R(K)$ (FIG. 3a), said frame including K sections $SR(1), SR(2), \ldots, SR(K)$, dropping the part labeled '$SR(K)$' in FIG. 3a will result in a shorter frame (FIG. 3b) corresponding to the compression of the speech to the rate $R(K-1)$, and which represents the best coding achievable at this rate. Similarly, dropping the parts labeled '$SR(K)$' and '$SR(K-1)$' in FIG. 3a will result in a shorter frame (FIG. 3c) corresponding to the compression of the speech to the rate $R(K-2)$, and which represents the best coding achievable at this rate, and so on for all the prescribed rates down to the lowest rate $R(1)$. One interesting feature of the invention is based on the fact that, at low bit rates, the dynamic allocation of levels is much more efficient than the dynamic allocation of bits, while at high bit rates both methods are equivalent.

The algorithm used in device (3) in FIG. 2 for the multirate allocation of level resources at bit rates $R(1), \ldots, R(K)$, may be summarized as follows:

First compute the number of quantizing levels $l(i,R(1))$ for the lowest rate $R(1)$, using a DAL algorithm based on the sub band energy contents. For instance, as mentioned in the above references, it may be considered at first order that the energy of the ith sub band $E(i)$ is proportional to the $C(i)$ to the power two, then one may use:

$$l(i,R(1)) = 2^{R(1)/p} \times \frac{C(i)}{\left(\underset{j=1}{\overset{p}{\text{PROD}}} C(j)\right)^{1/p}} \quad (1)$$

Then compute the $l(i,R(k))$, for $k=2, \ldots, K$ and $i=1, \ldots, p$ using relation (2):

$$l(i,R(k)) = l(i,R(1)) \times 2^{\frac{R(k)-R(1)}{p}} \quad (2)$$

Then quantize the sub-band samples $S(i,j)$ according to the $l(i,R(K))$, and

Finally multiplex the obtained sub band samples according to FIG. 3, where portion $SR(k)$ contains the added bits for obtaining samples quantized at rate $R(k)$, for $k=1, \ldots, K$.

The multirate frame should also include rate representative parameters.

Let's now focus on a more detailed operation of the sub-band coder by referring back to FIG. 2.

The input signal S(n) is split into p sub-bands by use of a bank of quadrature mirror filters (QMF's) (device 1, FIG. 2), the principles of which were described in details by D. Esteban and C. Galand in "Application of Quadrature Mirror Filters to Split Band Coding" presented at the IEEE ICASSP, Hartford, May 1977. Then, each sub-band signal is quantized by means of a Block Companded PCM quantizer (BCPCM) (device 4). The quantizer parameters are updated per block of samples, so as to take into account the short-term variations of the voice formant's frequencies and energies. Let S(i,j) denote the jth sample of the ith sub-band, and let's assume that the block duration corresponds to N sub-band samples. Practical values are p=8 and N=16.

In the following we may refer to so called macro samples with the kth macro sample being considered to represent the set of samples S(i,t), (i=1, ..., p) occurring at the same time t.

For each sub-band signal S(i,j), (i=1, ..., p and j=1, ..., n), one determines on a characteristic determinator (device 2) the so-called sub-band characteristic:

$$C(i) = \text{Max} (S(i,j)) \quad j = 1, N \tag{3}$$

The sub-band characteristics C(i), for (i=1, ..., p) are then coded in device (2) with a reduced number of bits. Such an encoding has been described in the above cited references, e.g. in the Denver IEEE ICASSP reference, and can be easily achieved with 4 bits. The 4-bit encoded characteristics C(i) are multiplexed in the Multiplexor device (5) for being included into b(n) and eventually transmitted. It should be noted that successive coding and decoding operations, like those operated on a same C(i), lead in practice to slightly altering the C(i) value and the C(i) output of device (2) should mention that difference. We, however, did not use different notations for the considered terms for sake of clarity in the notations.

In the multirate sub-band coder, the operation at full rate comprises a common overhead (OV), including the P 4-bit encoded characteristics C(i), (i=1, p). These bits are inserted into the 1st section SR(1) of the b(n) multirate frame as represented in FIG. 3, and corresponding to a theoretical bit rate R(0). The same observation also applies to a VEPC type of coder wherein R(0) would be made to include the encoded PARCOR coefficients and other high frequency energy representative data.

As a result, the bit rate r(k) actually available for the quantization of the sub-band samples at rate R(k) is given by:

$$r(k) = R(k) - R(0) \text{ for } k=1, \ldots, K \tag{4}$$

As mentioned above, the levels allocation is computed at the lowest considered bit rate, involving r(1)=R(1)−R(0).

The decoded characteristics C(i) provided by device (2) are locally used in device (3) to derive the allocation of the available levels resources at the lowest rate R(1). One can show that the overall signal to quantizing noise ratio is minimized when the number of levels l(i) (i=1, ..., p) in each sub-band is determined according to:

$$l(i,R(1)) = 2^{r(1)/p} \times \frac{C(i)}{(\text{PROD}_{j=1}^{p} C(j))^{\frac{1}{p}}} \tag{5}$$

with $\text{PROD}_{j=1}^{p} C(j) = C(1) \cdot C(2) \ldots C(p)$

The l(i,R(1)) derived from equation (5) are generally not integer values and in addition they may be out of the allowable range of the quantizer. They need to be adjusted or otherwise truncated or rounded-off to integer values L(i,R(1)).

The rounding-off is achieved in such a way that the final L(i) values match the following constraint:

$$\text{PROD}_{i=1}^{p} L(i,R(1)) \leq 2^{r(1)} \tag{6}$$

With PROD meaning "product of the considered terms". So as to obtain a set of integer L(i)'s that matches the optimal allocation distribution and checks the product constraint (6), we use the following procedure which is specially attractive because the corresponding complexity is very low.

It consists in computing the integer desired final values recursively one after one by taking the previously attributed values into account with a global weighting ratio.

The method comprises two steps, described below, and represented on attached flowcharts of FIGS. 4–6.

Figure 4:
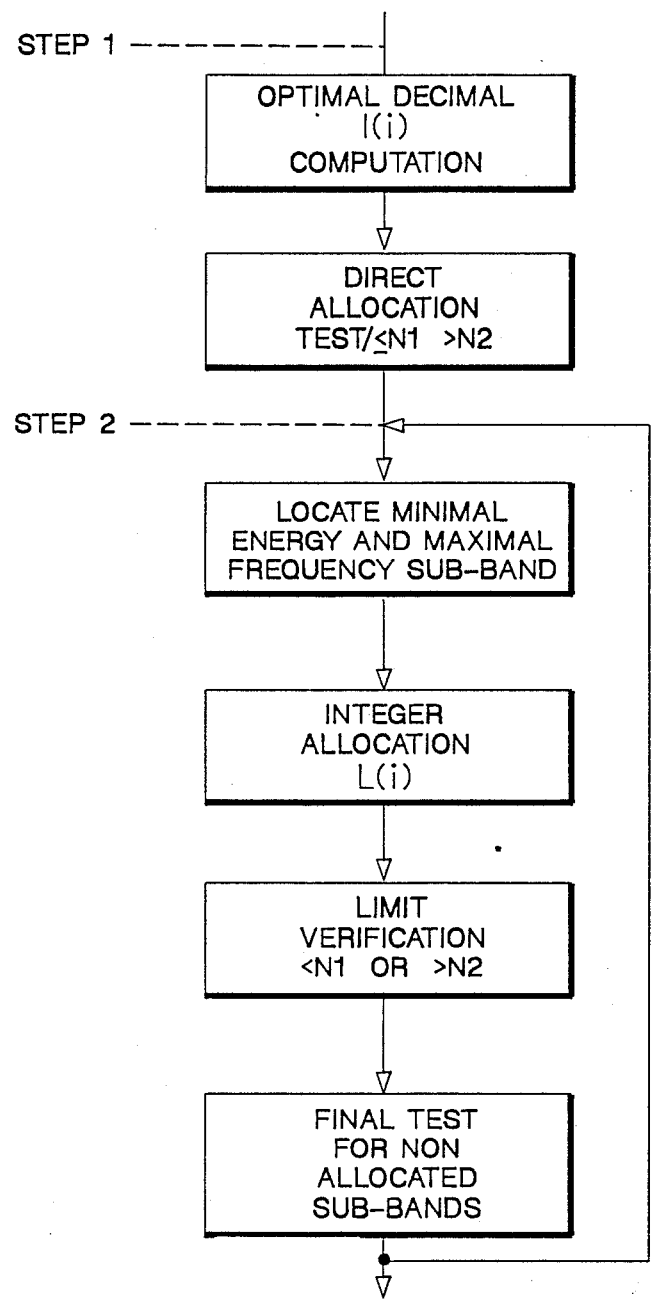
FIGS. 4 through 6 are flow charts for the invention.

FIG. 4 shows the basic principles of the algorithm made for determining the integer optimal value to be assigned to L(i,(R(1)), involving:

STEP 1

The aim of the first step of the method is to determine the optimal decimal level allocation l(i,R(1)) according to (5), discarding the sub-band getting an allocation out of range, and computing an allocation ratio noted a, thus:

first computing the optimal decimal values for l(i,R(1));

then setting to a predetermined value N1 any l(i) smaller or equal to N1, and setting to predetermined value N2 any l(i) greater than N2. Those set l(i)'s are then "discarded" from the remaining operations. Typical values for N1 may be equal to 1 or 2;

STEP 2

The second step is a recursive procedure which computes directly the final integer allocation L(i,R(1)) (i=1, ..., NR), sub-band by sub-band for the NR not yet allocated sub-bands, thus:

Scanning the sub-bands to locate the highest ith referenced sub-band carrying the lowest energy, the sub bands being ordered in an increasing frequency (i) related order;

Allocating an integer value L(i) to the located sub band;

Setting either to N1 or N2 the allocated L(i) based on said L(i) being either smaller to N1 or strictly greater than N2;

Testing for locating the remaining sub bands, and repeating the process of step 2 for remaining sub bands.

Figure 5:
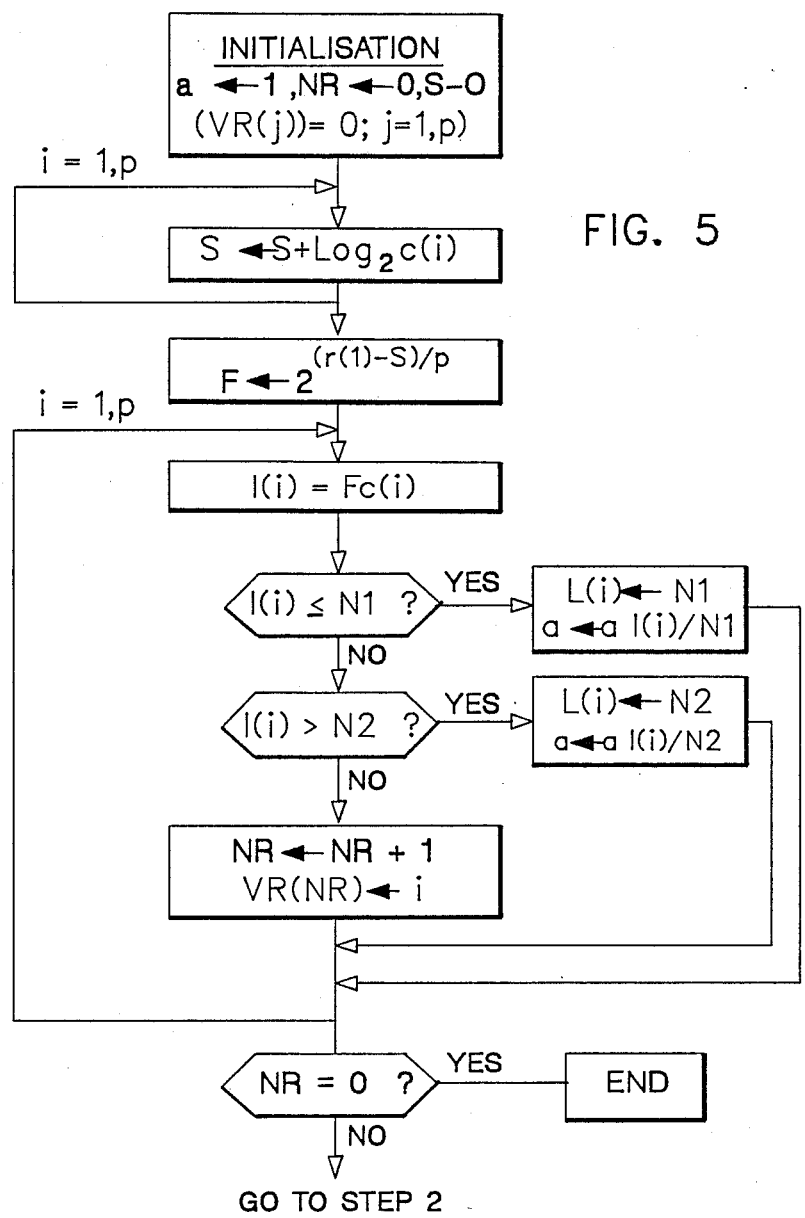
Figure 6:
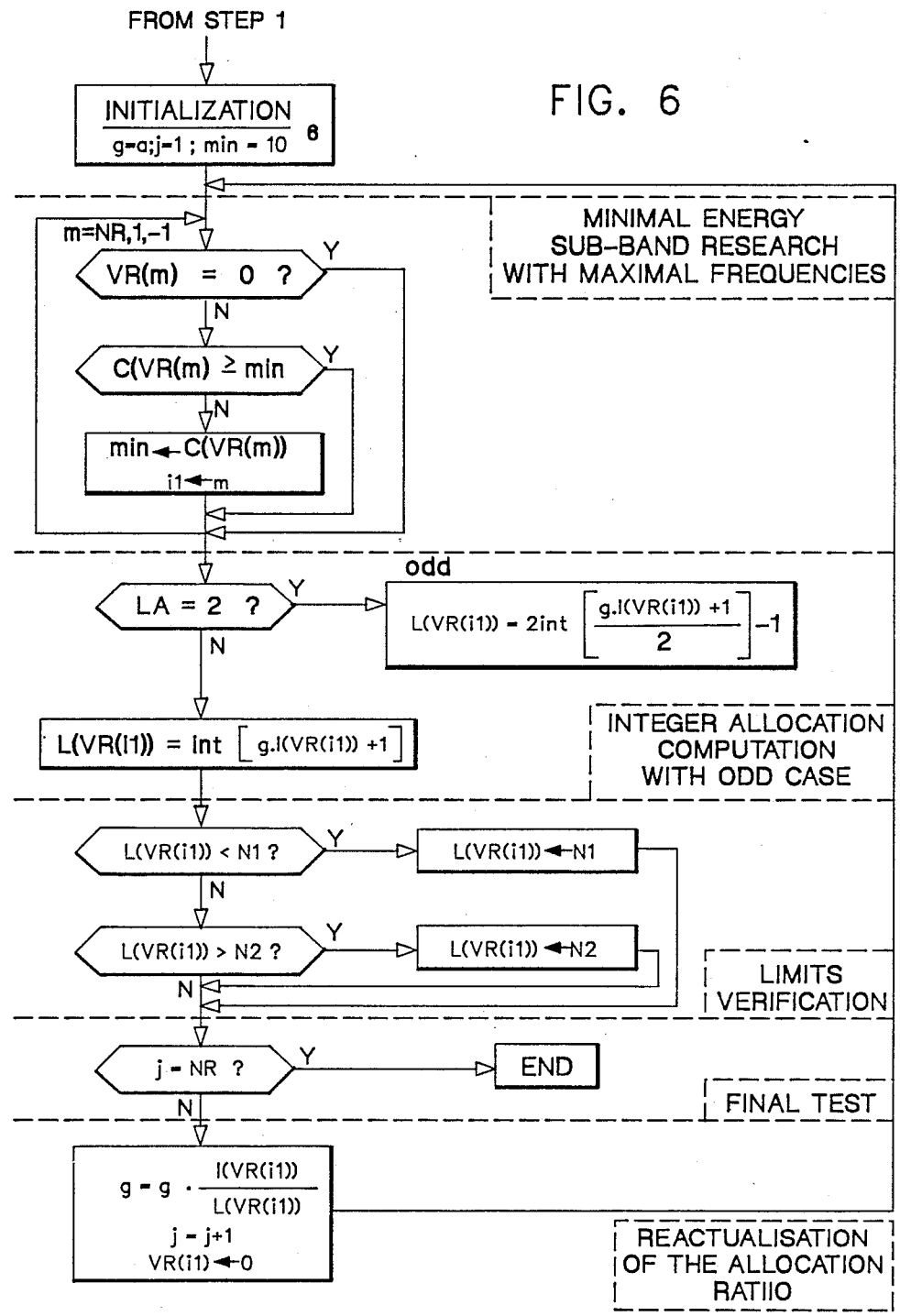

The detailed flow chart for the preferred embodiment of the above process for setting the L(i,R(1)) is represented in FIGS. 5 and 6.

Represented in FIG. 5 is a flow chart made to implement a primary level allocation for performing the above cited step 1.

STEP 1 (Primary allocation)

One can summarize this step as follows:
- 1(i,R(1)) computed based on (7)
- If $1(i,R(1)) \geq N1$, $L(i,R(1))=N1$ and $a=a \times 1(i,R(1))/N1$ (N1=1 (odd allocation) or 2 (even allocation))
- If $1(i,R(1))>N2$, $L(i,R(1))=N2$ and $a=a \times 1(i,R(1))/N2$.

These tests are executed for i=1, ..., p, and with the parameter "a" being initialized to 1.

"a" is updated for each of these final allocations (L(i,R(1)) in order to take into account this attribution for the other sub-bands in step 2.

Remark: The computation of 1(i,R(1)) (5), is made so as reduce the number of operations:

$$1(i, R(1)) = C(i) \times 2^{\left(\left(r(1) - \sum_{j=1}^{p} \log(C(j))/p\right)\right)} \quad (7)$$

$$= C(i) \times 2^{(r(1)-S)/p}$$

(log being a base 2 logarithm and S representing $\sum_{j=1}^{p} \log C(j)$).

Represented in FIG. 6 is the algorithm for processing the not yet allocated sub-bands.

STEP 2 (Algorithm for not yet allocated sub-bands)

The highest priority sub-band allocation is assigned to the energy consideration:
- (1) Least energy decreasing (C(i) min).
- (2) Upper i (frequency max).

The first priority ensures the algorithm convergence with matching to the constraint (6)

We compute for each of the NR sub-bands not yet allocated its integer final allocation by:

Starting with the constant g=a, $$L(i,R(1))=Int(g \times 1(i,R(1))) \quad (1)$$

for a general case (or $L(i,R(1))=2Int((g \times 1(i,R(1))+1)/2)-1$ for an odd allocation)
then $$g=g \times 1(i,R(1))/L(i,R(1)) \quad (2)$$

where Int (x) denotes the truncated integer value of (x).

As the parameter "a", the parameter "g" takes into account the new fixed final allocation L(i,R(1)) at each time i, in addition to the preceeding ones for the further allocation computation of the sub-band not yet allocated.

Remark: The odd levels allocation that can be obtained with this algorithm, allows better results than with the even one (e.g. bit allocation) due to the statistics of the speech in sub-bands (midtread quantizer).

Once the level allocation L(i,R(1)) (i=1, ..., p) has been computed for the lowest bit rate R(1) using the above algorithm, the system computes the L(i,R(k)) for k=2, ..., K and i=1, ..., p using relation (8), derived from (2):

$$L(i,R(k)) = L(i,R(1)) \times 2^{\left(\frac{R(k)-R(1)}{p}\right)} \quad (8)$$

Equation (8) being applied to rates k=2..., K, then one may write $$L(i,R(k)) = L(i,R(k-1)) \times 2^{\frac{R(k)-R(k-1)}{p}} \quad (9)$$

for i=1, ..., p
and k=2, ..., K.

If the considered bit rates, expressed in number of bits per macro sample (MS), differ from each other by a multiple of the number p of sub-bands, then relation (9) just consists in adding an integer number of bits to L(i,R(k−1)) to obtain L(i,R(k)).

If the considered bit rates R(k), (k=1, ..., K), expressed in number of bits per macrosample (MS), do not differ from each other by a multiple of the number p of sub bands, i.e. if (R(k)−R(k−1))/p is not an integer value for all k, (k=2, ..., K), then the computation of the L(i,R(k)) for k=2, ..., K and i=1, ..., p must be performed differently.

In this case, since (R(k)−R(k−1)) is an integer, it is always possible to find integer numbers m(k), such that $$\frac{(R(k) - R(k-1))}{m(k)}$$

is an integer for k=2, ..., K.

Then the values m(k), (k=2, ..., K) are used to increment the bit rates according to:

$$L(i,R(2))=L(i,R(1)) \times 2^{(R(2)-R(1))/m(2)} \quad (10)$$

for i=1, ..., m (2)

$$L(i,R(3))=L(i,R(2)) \times 2^{(R(3)-R(2))/m(3)} \quad (11)$$

for i=m(2)+1, ..., m(2)+m(3) (mod p)

and so on up to $$L(i,R(K))=L(i,R(K-1)) \times 2^{(R(K)-R(K-1))/m(K)} \quad (12)$$

for i=m(K−1)+1, ..., m(K−1)+m(K) (mod p)

where (mod p) denotes the evaluation modulo p. For example, if p=8 and m(2)=5, and m(3)=6 the first relation would be evaluated for i=1, ..., 5, and the second relation would be evaluated for i=6, ..., 11 (mod 8), i.e. for i=6 to 8 and for i=1 to 3.

In this way, each sub-band receives additional bits one after the other, when the rate/level is upgraded from L(i,R(1)) to L(i,R(K)). Since one just requires the knowledge of the R(k) to derive the m(k), the same algorithm can be used for the decoding at the receiver, without transmitting any additional information.

In practice however, it is easier to define the bit rates R(k) in such a way that, when expressed in number of bits per macro-sample, they differ by a multiple of the number p of sub-bands. In the following, we will consider that the rates R(k) differ from each other by a multiple of p.

Once the optimal integer values for the number of levels L(i,R(k)), (k=1, ..., K) to be assigned to the sub-bands i=1,2, ..., p have been determined, the sub-band signals S(i,j) are quantized as follows.

Given a block of samples S(i,j), for (i=1, ..., p), (j=1, ..., N), and the rates/levels L(i,R(k)), (k=1, ..., K), the first objective is to determine the quantized versions of these samples: S1(i,j) at rate/level L(i,R(1)), S2(i,j) at rate/level L(i,R(2)), ..., SK(i,j) at rate/level L(i,R(K)).

The second objective is to determine the incremental values T2(i,j), T3(i,j), ..., TK(i,j) to be combined with S1(i,j) to get back S2(i,j), S3(i,j), ..., SK(i,j) respectively. These incremental values will be furthermore multiplexed in the various parts of the transmitted frame to construct the multi-rate structure (FIG. 3).

Figure 7:
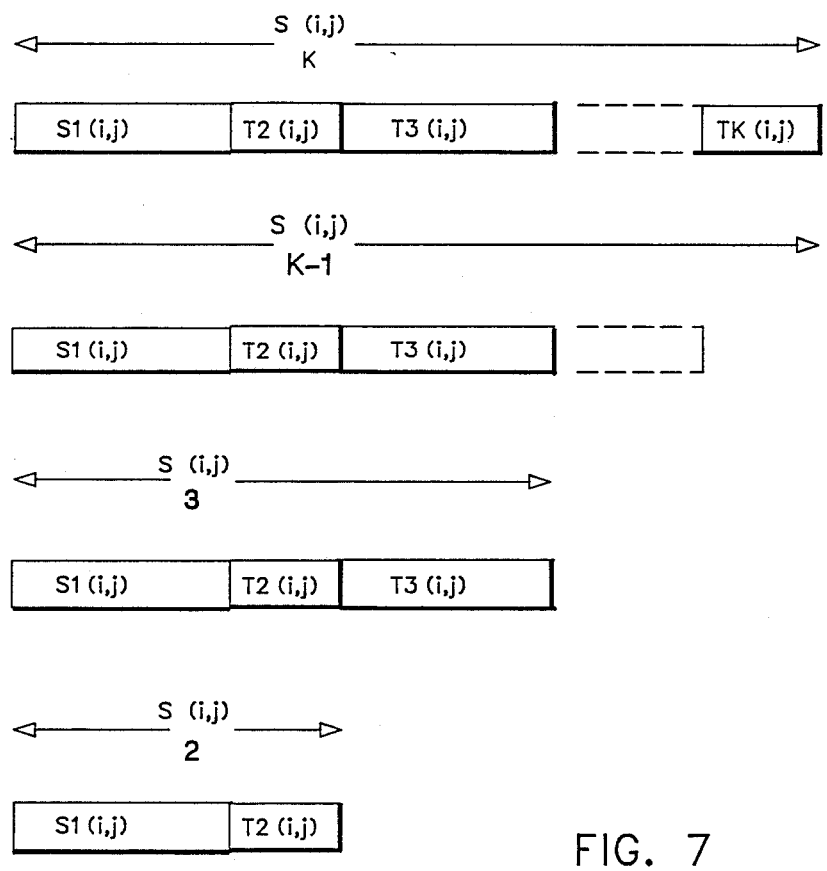
FIG. 7 illustrates the frame for the splitting of a sub-band sample SK(i,j) quantized at rate L(i,R(K)) in incremental values TK(i,j).

FIG. 7 represents the splitting of a quantized sample SK(i,j) into the different incremental values.

Figure 8:
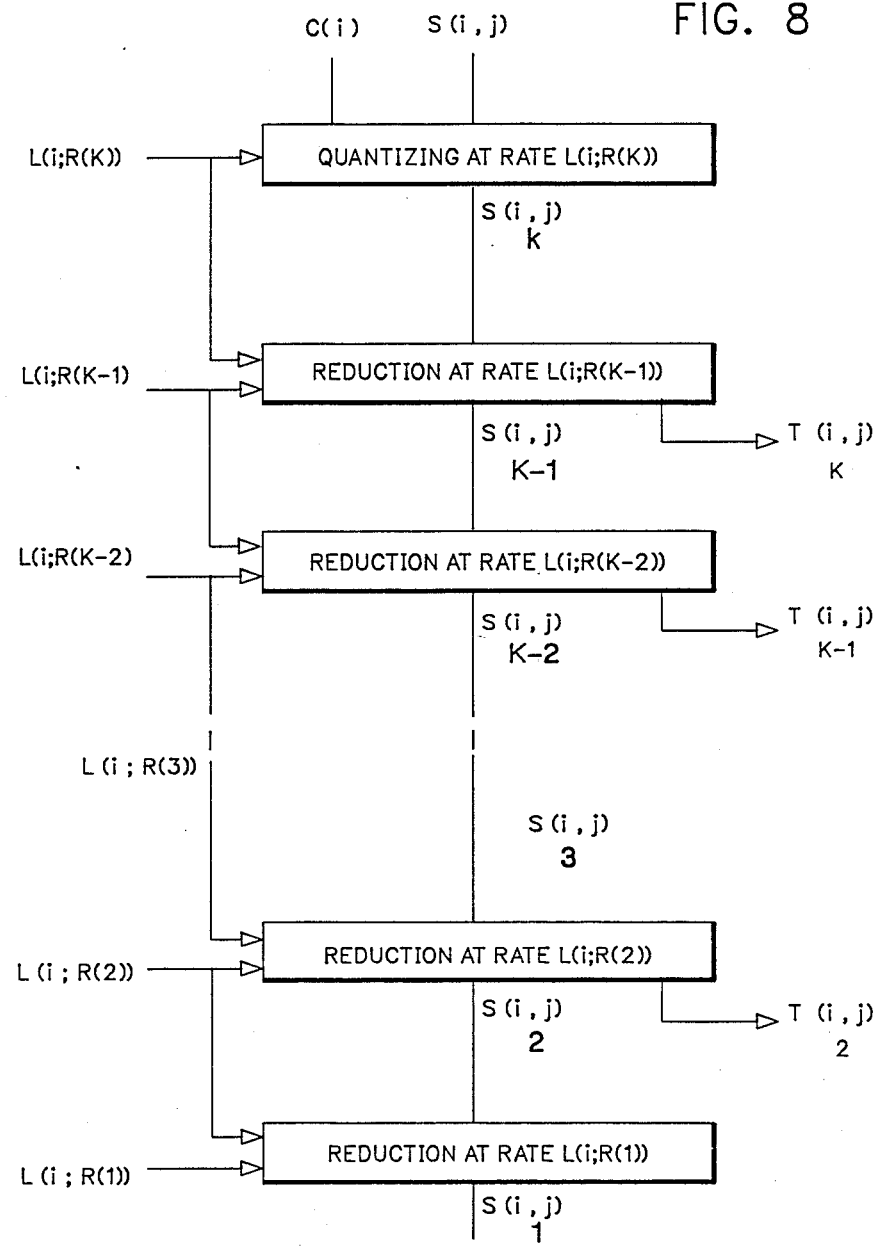
FIG. 8 is an algorithm of a rate reduction device.

The block diagram of the technique used for the determination of these values is shown in FIG. 8.

The sub-band samples S(i,j) are first quantized at the highest rate L(i,R(K)). The output SK(i,j) of the quantizer are obtained as follows. Assuming L(i,R(K)) is not equal to 1, the quantizer step size QK(i) is evaluated for each sub-band i,(i=1, ..., p), by:

(13) $QK(i) = 2.C(i)/L(i,R(k))$

Then the sub-band samples S(i,j) are quantized by:

(14) $S_K(i,j) = \text{Int}(S(i,j)/QK(i))$ $i = 1, \ldots, p$
$j = 1, \ldots, N$.

(It should be noted that in this description Sk and Tk for k=1, ..., K are equivalent to Sk and Tk respectively, these equivalent notations are used to avoid confusing notations like S(k−1)(i,j) or T(k−1)(i-j) for instance).

These samples are then processed by a rate reduction device shown in FIG. 8, which sequentially derives the samples $$\underset{k-1}{S}(i,j) \text{ for } k = K-1 \text{ to } 1 \text{ and } \underset{k}{T}(i,j), \text{ for } k = K, \ldots, 2,$$

as follows:

$$\Delta(i,k) = L(i,R(k))/L(i,R(k-1)) = 2^{\left(\frac{R(k)-R(k-1)}{p}\right)} \quad (15)$$

$$\underset{k-1}{S}(i,j) = \text{Int}\left(\underset{k}{S}(i,j)/\text{DELT}(i,k)\right) \quad (16)$$

if L(i;R(k−1)) is even $$\underset{k-1}{S}(i,j) = \text{Int}\left(.5 + \underset{k}{S}(i,j)/\text{DELT}(i,k)\right) \quad (17)$$

if L(i,R(k−1)) is odd.

$$\underset{k}{T}(i,j) = \underset{k}{S}(i,j) - \underset{k-1}{S}(i,j) \times \text{DELT}(i,k) \quad (18)$$

$i = 1, \ldots, p$ $j = 1, \ldots, N$

Relations (15) and (18) show that the incremental values Tk(i,j),(k=K, ..., 2) are coded with an integer number of bits: (R(k)−R(k−1))/p. These bits are packed in the corresponding portion of the mutirate frame. More precisely, the Tk(i,j) are grouped for all sub-bands (i=1, ..., p) and for all sampling intervals (j=1, ..., N) in portion SR(k) of the frame (see FIG. 3).

The value S1(i,j) represents the quantization of the sample S(i,j) at rate R(1), and by definition may be coded with a non integer number of bits (L(i,R(1))) not a power of 2). Portion SR(1) of the frame shown on FIG. 3 includes the values S1(i,j) for all the sub-bands (i=1, ..., p) and for all the sampling intervals (j=1, ..., N) of the considered block.

Figure 9:
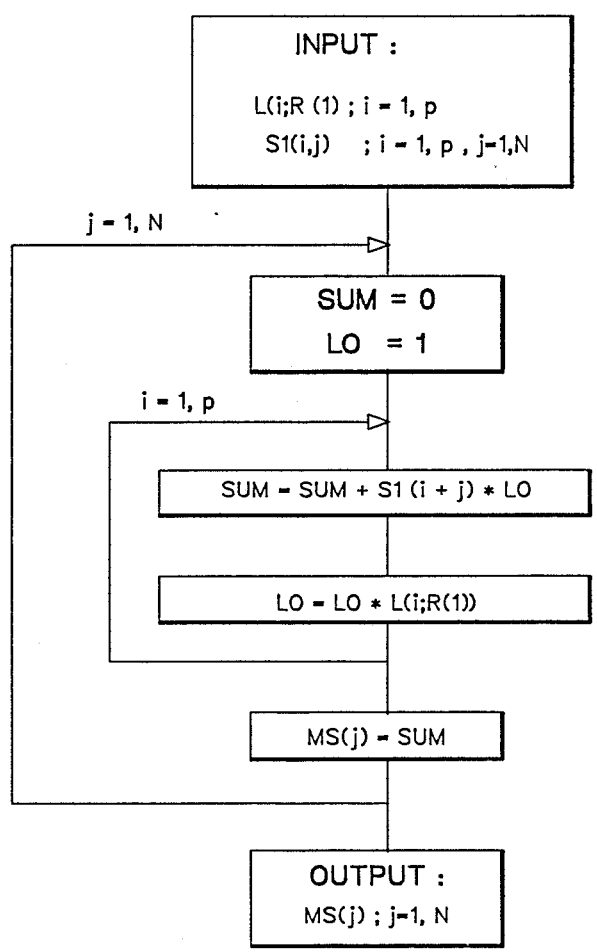
FIG. 9 is a flow chart for the packing of sub-band samples at rate R(1).

This packing is achieved (in multiplexer 5 of FIG. 2) by grouping the sub-band samples S(i,j) (i=1, ..., p) pertaining to a same macro-sample (i.e. group of samples obtained at the same sampling time over the p sub-bands), in a device implementing the algorithm shown in FIG. 9.

According to:

$$Ms(j) = \sum_{i=1}^{p} S1(i,j) - \left(\underset{k=1}{\overset{i-1}{\text{PROD}}} L(k,R(1))\right)$$

for $j = 1, \ldots N$

This device allows to pack the macro-sample S(i,j) (i=1, ..., p) in a r(1)-bit word MS(j). The packing of all the macro samples of the block will result in N words MS(j)(j=1, ..., N) which are multiplexed in portion SR(1) of the multirate frame (FIG. 3).

At the receiving end, the multirate frame is received, possibly truncated. Let's now consider that the multirate frame has been truncated at the rate R(m),(1<m<=K) during the transmission, i.e. either at the transmitter location or anywhere between coder and decoder.

The problem now is to obtain the decoded values Sm(i,j) of the samples S(i,j), given the coded values S1(i,j) at rate R(1) and the incremental values Tk(i,j),(k=2, ..., m) which still exist in the received portion of the frame.

This operation is achieved as follows.

First, the 4-bit coded characteristics C(i),(i=1, ..., p) are demultiplexed (in 6, FIG. 2) from the received frame and decoded (in 7).

The decoded values C(i) are used to derive the level allocation L(i,R(k)),(i=1, ..., p), (k=1, ..., m) in the same way it was performed at the transmitter location (relations (7) and (9)).

Figure 10:
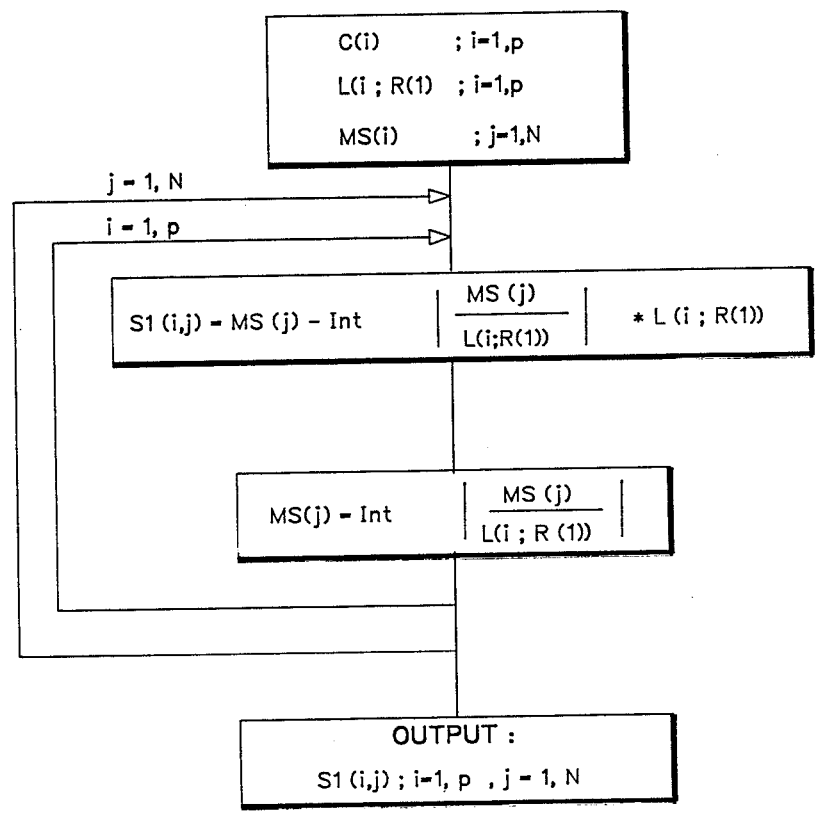
FIG. 10 is a flow chart for the unpacking of sub-band samples at rate R(1).

Then, portion SR(1) of the frame is processed to derive the N r(1) bit words MS(j),(j=1, ..., N). Each of these words MS(j) is processed by a device implementing the algorithm represented in FIG. 10 to derive the p sub-band samples S1(i,j),(i=1, ..., p) each of them being coded at the rate L(i,R(1)).

Portions SR(2), ..., SR(m) of the frame are processed to derive the incremental values Tk(i,j),(k=2, ..., m). Since by definition these incremental values Tk(i,j) are coded with an integer number of bits, this derivation is easily implemented by shifting operations, given the L(i,R(k),(k=2, ..., m). For example, if L(i,R(k))=8 and L(i,R(k−1))=2, then Tk(i,j) will be extracted from the frame by a 2-bit shift.

Then, the inverse quantization of the sub-band samples can take place. The problem is now to obtain the decoded values Sm(i,j) of the samples S(i,j) at rate R(m), given the coded values S1(i,j) at rate R(1) and the incremental values Tk(i,j),(k=2, ..., m).

Figure 11:
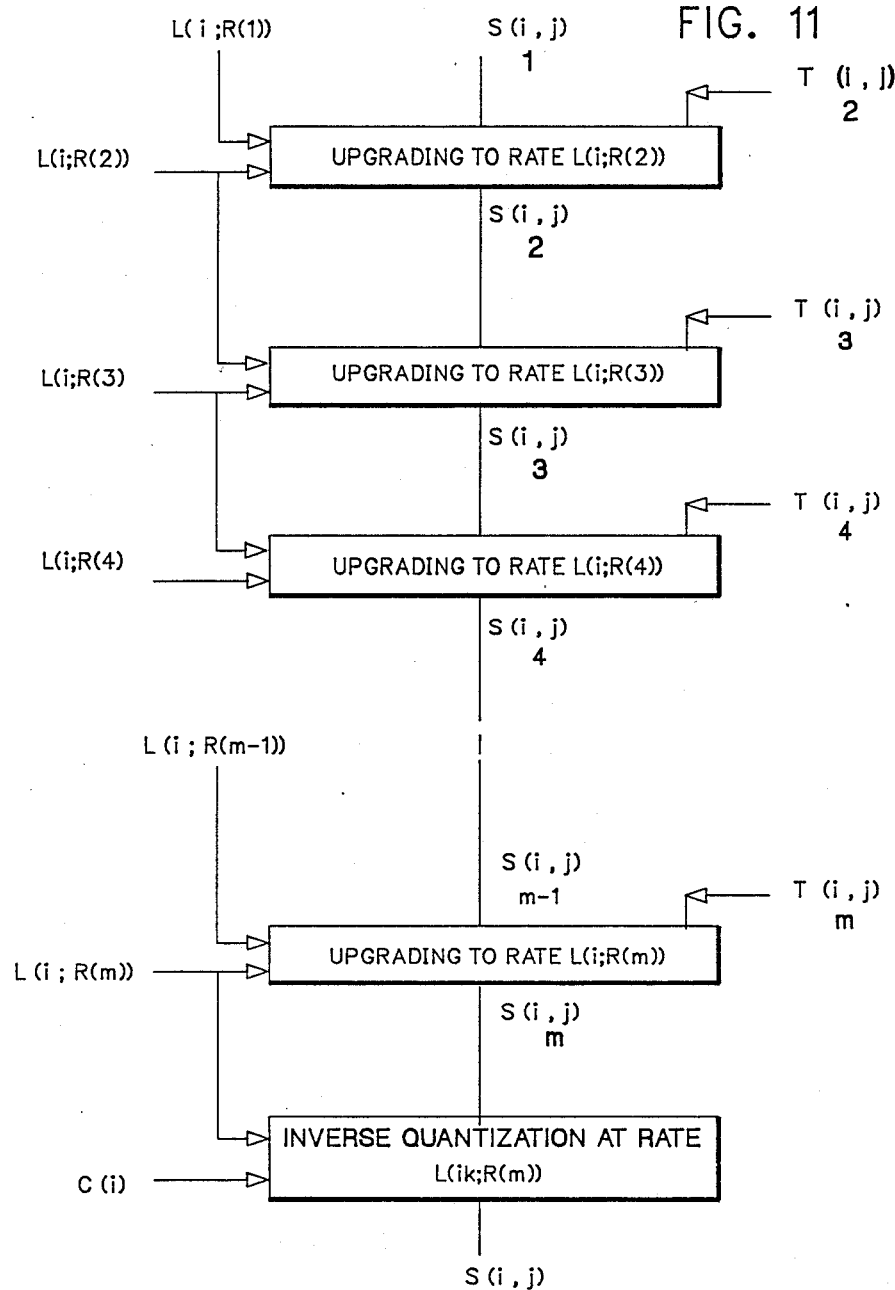
FIG. 11 is an algorithm for the upgrading of samples S1(i,j) to the higher rates.

The upgrading of the samples S1(i,j) to the higher rates R(2), ..., R(m), is implemented sequentially, in a device operating according to the algorithm shown in FIG. 11, as follows:

(19) $DELT(i,k) = L(i,R(k))/L(i,R(k-1))$

(20) $S_k(i,j) = T_k(i,j) + S_{k-1}(i,j) \times DELT(i,k)$

This relation is evaluated for k=2, ..., m, where m denotes the truncation order (if any) of the frame during its transmission. Once the samples Sm(i,j) coded at rate L(i,R(m)) have been reconstructed, the inverse quantization is performed as follows.

First the sub-band quantizer step sizes Qm(i) (i=1, ..., p) corresponding to the rates L(i,R(m)) are computed according to the following relation:

(21) $Q_m(i) = 2 \times C(i)/L(i,R(m))$

The reconstructed sub-band samples S(i,j) (i=1, ..., p) and (j=1, ..., N) are determined by:

$S(i,j) = Qm(i)(Sm(i,j) + 0.5)$ if L(i,R(m)) even and not equal to 1

(22) $S(i,j) = Qm(i) \times Sm(i,j))$ if L(i,R(m)) odd and not equal to 1
S(i,j)=0
if L(i,R(m))=1.

So as to illustrate the above described technique, let's consider for example the quantization, the rate reduction and upgrading, and the inverse quantization of a sub-band sample S(i,j) pertaining to a sub-band block with a characteristic C(i), to be quantized at the rates L(i,R(k))(k=1, ..., 3), with the following numerical application:

$S(i,j) = 777$ $C(i) = 1200$ (decoded value)

$L(i,R(1)) = 3$ $L(i,R(2)) = 12$ $L(i,R(3)) = 24$

Relations (13) to (18) give:

$Q3(i) = 2400/24 = 100$ $S3(i,j) = Int(777/100) = 7$

| SAMPLES | REPRESENTATION | | LEVELS/BITS |
| --- | --- | --- | --- |
|  | DECIMAL | BINARY |  |
| S3(i,j) | 7 | 00111 | 24 levels |
| S2(i,j) | 3 | 0011 | 12 levels |
| S1(i,j) | 1 | 01 | 3 levels |
| T3(i,j) | 1 | 1 | 1 bit |
| T2(i,j) | −1 | 11 | 2 bits |

FIG. 12 represents the decision levels (DL), transmitted levels (TL), reconstructed levels (RL) for this particular example. These levels can be interpreted as follows: any sample between two decision levels will be coded on the transmitted level comprised between these decision levels, and reconstructed by the corresponding reconstruction level. Note on the example that in the case of even order quantizers, the transmitted levels are identical to the decision levels, while they are identical to the reconstruction levels in case of odd order quantizers.

Relations (19) and (20) for the reconstruction of the quantized samples at each rate can be checked with the previous values, and give:

$DELT(i,2) = 4$ $DELT(i,3) = 2$ $S_2(i,j) = T_2(i,j) + S_1(i,j) \times DELT(i,2)$ $S_3(i,j) = T_3(i,j) + S_2(i,j) \times DELT(i,3)$ The decoded samples are then computed according to relations (21) and (22) at any of the three considered rates:

|  | m = 1 | m = 2 | m = 3 |
| --- | --- | --- | --- |
| L(i;R(m)) | 3 | 12 | 24 |
| Qm (i) | 800 | 200 | 100 |
| S(i,j) | 800 | 700 | 750 |

Going back to FIG. 1, once each port coder has recoded the signal it has been provided with and has arranged it into a multirate frame, the Activity Controller and Multiplexer prepares a super-frame to be fed onto the wide band link. Each port coder multirate bit stream, is designated here by b(1,n), b(2,n), b(3,n), ..., b(L,n). It should be adjusted to a rate adequately selected among the rates R(1), R(2), ..., or R(K) based on the relative energy provided to the considered port. This task is devoted to the Activity Controller and could be accomplished using several ways. For instance, one may take advantage of the availability of the C(i)'s as parameters representative of the sub-band energy contents and optimize the rates distribution throughout the ports to fit optimally to the wide band link rate Nc.

Figure 13:
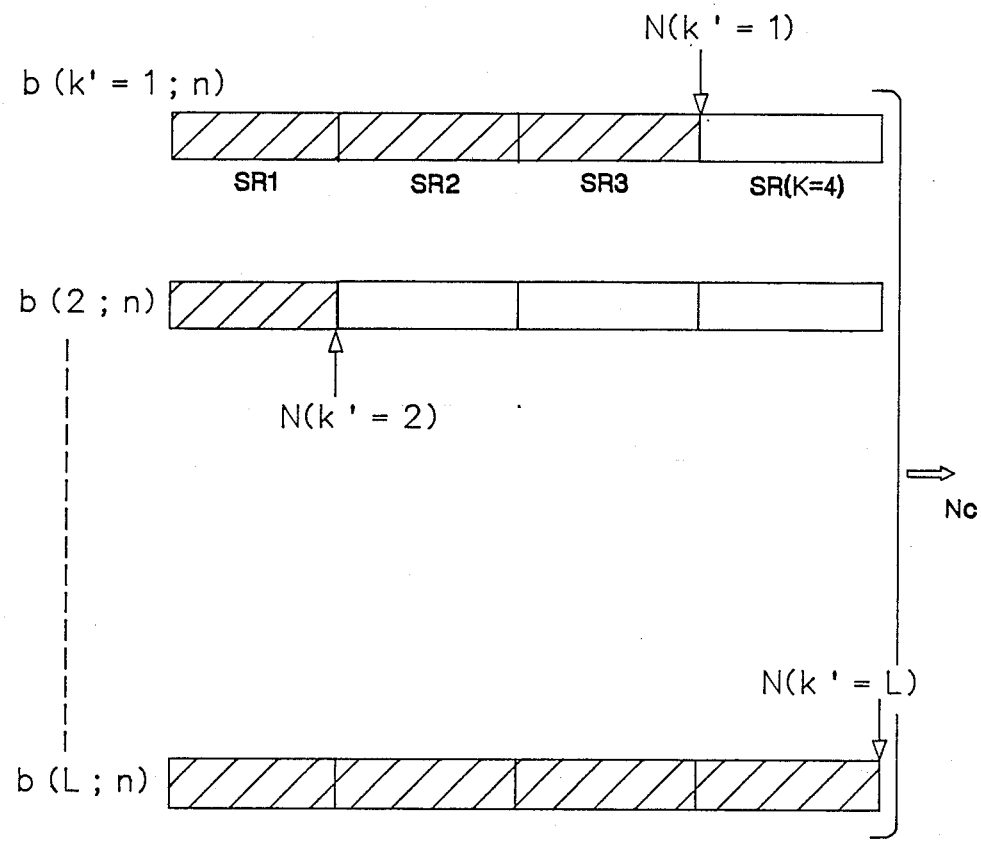
FIG. 13 is an illustration of the frame operation applied to a multiport system.

FIG. 13 represents the un-truncated full rate frames b(k',n) with the frame sections. Before being multiplexed over the wide band link at rate Nc, the individual port frames may have to be truncated to a k' port rate N(k') selected among the rates R(1), R(2), ..., R(K).

$$\text{SUM}_{k'=1}^{L} N(k') = NC \quad (23)$$

For each port k', an energy related information W'(k') is derived by computing $$W'(k') = \log \left( \underset{i=1,p}{\text{Max}} \ C(i,k') \right) \quad (24)$$

For k'=1,2,..., L.
The port bit rate N(k') is then derived from $$N(k') = (1/L) \cdot \left( Nc - \underset{l=1}{\overset{L}{\text{SUM}}} W''(l) \right) + W''(k') \quad (25)$$

With W''(k')=W'(k')/<W'(k')>
wherein <W'(k')> is a mean value representative of the W'(k') value over a relatively long period of the order of the syllabic time length (0.5 to 2 seconds for instance). Besides, a threshold which should not be exceeded is assigned to W'(k'). In practice, the expression (1) would not directly provide a rate within the set of rates R(1), R(2), ..., R(K). The Activity Controller is thus made to truncate the N(k') to the nearest R(k) value.

While the invention has been particularly shown and described with reference to the preferred embodiment thereof, it will be understood that various changes of form and details may be made therein without departing from the spirit and scope of the invention.

We claim:

1. A process for digitally block encoding a signal at a predetermined set of rates R(1)<R(2)<...<R(K) and for embedding the encoded signal into a multirate frame, including k sections numbered 1, 2, ... K, said encoding involving splitting the signal bandwidth into p sub-bands to derive therefrom sub band signal samples S(i,j) where i=1, ..., p is the sub band index and j=1, ..., N the sample index, within a block of N samples, requantizing the S(i,j)'s through a block quantizer the quantizing levels of which are optimally and dynamically adjusted to the relative sub band energy contents E(i); and multiplexing the requantized sub band samples into said multirate frame, said process being characterized in that it includes:

computing the number of levels l(i, R(1)) for the lowest rate R(1);
deriving the number of levels l(i, R(k)) for the subsequent rates using:

$$l(i, R(k)) = l(i, R(1)) \times 2\left( \frac{R(k) - R(1)}{p} \right)$$

for
k=2, ..., K
i=1, ..., p, quantizing the sub-band samples S(i,j) with the quantizer step adjusted to the number of levels computed for the highest rate R(K);
multiplexing the coded sub-band samples S(i,j) into a multirate frame including K sections, wherein SR(k) for k=1, ..., K contains the sample bits to be added to samples quantized at rate R(k−1) for obtaining samples quantized at R(k).

2. A process according to claim 1 wherein the bit rate r(k) available for a quantizing of sub-band samples for rate R(k) is r(k)=R(k)−R(0), with R(0) being the bit rate to be assigned for overhead encoding purposes and inserted into section SR(1) of said multirate frame.

3. A process according to claim 1 wherein said block encoding is performed using BCPCM techniques providing sub band characteristic terms C(i) to be used as parameters representative of the sub-bands energy contents to be inserted into the multirate frame overhead section.

4. A process according to claim 3 wherein said number of levels l(i,R(1)) is derived from $$l(i, R(1)) = 2^{(r(1)/p)} \times \frac{C(i)}{\left( \underset{j=1}{\overset{p}{\text{PROD}}} C(j)^{\frac{1}{p}} \right)}$$

5. A process according to claim 4 wherein the number of levels l(i,R(1)) is rounded off to integer value L(i;R(1)) with $$\underset{i=1}{\overset{p}{\text{PROD}}} L(i, R(1)) \leq 2^{r(1)}$$

6. A process for encoding a voice signal using predictive encoding techniques providing a low frequency bandwidth signal to be processed according to claim 5 and parameters representative of the high frequency bandwidth energy contents inserted into said overhead multirate frame section.

7. A process according to claim 5 further characterized in that said L(i,R(1)) computing are performed optimally using the following operations:

a computing the optimal decimal values for l(i,R(1))
b setting to a predetermined value N1 any l(i,R(1)) smaller or equal to N1, and setting to a predetermined value N2 any l(i;R(1)) greater than N2; and discarding the l(i,R(1)) set sub-bands, from the following operations;
c scanning the sub bands to locate the highest ith sub band carrying the lowest energy;
d allocating an integer value L(i,R(1)) to the located sub band;
e setting either to N1 or to N2 the allocated L(i,R(1)) based on said L(i,R(1)) either being smaller to N1 or being strictly greater than N2;
f testing for locating the remaining non L(i,R(1)) set sub bands and repeating the operations starting from step "c" for said non set sub bands.

8. A process according to claim 7 wherein said integer values L(i,R(k)) are derived from L(i,R(1)), for k=2, ..., K, using:

$$L(i, R(k)) = L(i, R(1)) \times 2^{\left(\frac{R(k) - R(1)}{p}\right)}$$

9. A process according to claim 8 for processing bit rates differing from each other by a multiple of the number p of sub bands and wherein L(i)R(k)) is derived by simply adding an integer number of bits to L(i,R(k−1).

10. A process according to claim 8 wherein L(i,R(k)) is derived from L(i,R(k−1)) using:

$$L(i,R(k)) = L(i,R(k-1)) \times 2^{b(k)}$$

with $b(k) = (R(k) - R(k-1))/p$.

11. A process according to any one of claims 5 characterized in that said sub band samples S(i,j) quantizing operations involve:

setting a quantizer step size QK(i) for the ith sub band to:

$$QK(i) = 2 \times C(i)/L(i,R(K))$$

i=1, ..., p;
quantizing each sample to a new $S_K(i,j)$ value with:

$$S_K(i,j) = Int(S(i,j)/QK(i))$$

for i=1, ..., p
and j=1, ..., N
where Int(A) denotes the integer part of A;
rate reducing the quantized SK(i,j) samples to sequentially derive therefrom data $S_{k-1}(i,j)$ for k=K−1, ..., 1 and $T_k$ for k=K, ..., 2 using $$S_{k-1}(i,j) = Int(S_k(i,j)/\Delta(i,k))$$

if L(i,R(k−1)) is even
or $$S_{k-1}(i,j) = Int(0.5 + S_k(i,j)/\Delta(i,k))$$

if L(i,R(k−1)) is odd
and $$T_k(i,j) = S_k(i,j) - S_{(k-1)}(i,j) \times \Delta(i,k)$$

with $\Delta(i, k) = 2^{\left(\frac{R(k) - R(k-2)}{p}\right)}$ to derive therefrom data S1(i,j) and T2(i,j), ..., TK(i,j);
packing the derived data into a macro-sample frame made to include the S1(i,j) for the p sub-bands into a first section SR1, and the T2(i,j), ..., TK(i,j) into subsequent sections.

12. A process according to claim 11, wherein the macro sample SR1 section packing includes:
packing the S1(i,j) for i=1, ... p into r(1) - bit words MS (j), according to:

with $\Delta(i, k) = 2^{\left(\frac{R(k) - R(k-2)}{p}\right)}$ multiplexing the N words MS(j) into same section SR1.

13. A sub-band coding system for digitally BCPCM encoding a speech signal S(n) at a predetermined rate R(k) selected among a set of rates R(1)<R(2)<...<R(K), said system including a QMF filter bank splitting at least a portion of the speech bandwidth into p sub bands and providing S(i,j) signal samples, i=1,2, ..., p and j being the sample index within a BCPCM block; means coupled to said QMF filter bank for deriving C(i) characteristics terms from said signal samples; level means connected to said filter bank to derive number of quantizing levels by using said C(i)'s for the lowest rate R(1) and derive therefrom the levels for the other rates R(2), ..., R(K); quantizing means connected to said level means and to said bank of filters to requantize said S(i,j) samples based on the number of quantizing levels for the highest rate R(K); said system being characterized in that it includes means for multiplexing said quantized S(i,j) and said C(i) into said multirate frame, said multirate frame including a section for inserting therein the C(i)'s and sections for inserting the requantized S(i,j) bits for each one of said rates.

14. A multiport speech encoding system for concentrating encoded speech onto a wide band link, said multiport systems including:
at least one sub-band coder coupled to a port of said multiport system, said one sub-band coder analyzing an input speech signal and generating therefrom signal sampler S(i,j) and C(i) characteristics terms from said signal samples and thereafter multiplexing said signal samples and said characteristics terms into a multirate frame;
at least one port activity controller connected to the at least one sub-band coder for measuring the relative port activity and for adjusting each port multirate frame length by truncating the frame by dropping, as required, sections of each individual port multirate frame; and,
multiplexing means for multiplexing the adjusted port frames over said wide band link.

15. A sub-band coding system for digitally BCPCM encoding a speech signal S(n) at a predetermined rate R(k) selected among a set of rates R(1)<R(2)<...<R(K), said system including a QMF filter bank splitting at least a portion of the speech bandwidth into p sub bands and providing S(i,j) signal samples, 6=1,2, ..., p and j being the sample index within a BCPCM block; means coupled to said QMF filter bank for deriving C(i) characteristics terms from said signal samples; level means connected to said filter bank to derive number of quantizing levels by using said C(i)'s for the lowest rate R(1) and derive therefrom the levels for the other rates R(2), ..., R(K); quantizing means connected to said level means and to said bank of filters to requantize said S(i,j) samples based on the number of quantizing levels for the highest rate R(K); and means for multiplexing said quantized S(i,j) and said C(i) into said multirate frame, said multirate frame including a section for inserting therein the C(i)'s and sections for inserting the requantized S(i,j) bits for each one of said rates.

* * * * *